US009662631B2

(12) United States Patent
Gigli et al.

(10) Patent No.: US 9,662,631 B2
(45) Date of Patent: May 30, 2017

(54) DESICCANT COMPOSITION CONTAINING SURFACE-MODIFIED POWDERS OF METAL OXIDES USEFUL FOR MANUFACTURE AND PROTECTION OF MOISTURE-SENSITIVE DEVICES

(71) Applicant: SAES GETTERS S.P.A., Lainate (IT)

(72) Inventors: Jiabril Gigli, Milan (IT); Giorgio Macchi, Samarate (IT); Marco Mudu, Rho (IT); Paolo Vacca, Milan (IT)

(73) Assignee: SAES GETTERS S.P.A., Lainate, MI (IT)

( * ) Notice: Subject to any disclaimer, the term of this patent is extended or adjusted under 35 U.S.C. 154(b) by 0 days.

(21) Appl. No.: 14/344,259

(22) PCT Filed: Feb. 19, 2013

(86) PCT No.: PCT/IB2013/051333
§ 371 (c)(1),
(2) Date: Mar. 11, 2014

(87) PCT Pub. No.: WO2013/182917
PCT Pub. Date: Dec. 12, 2013

(65) Prior Publication Data
US 2014/0367608 A1  Dec. 18, 2014

(30) Foreign Application Priority Data
Jun. 8, 2012  (IT) .............. MI2012A0999

(51) Int. Cl.
*B01J 20/22* (2006.01)
*B01J 20/30* (2006.01)
(Continued)

(52) U.S. Cl.
CPC .......... *B01J 20/223* (2013.01); *B01J 20/041* (2013.01); *B01J 20/06* (2013.01); *B01J 20/22* (2013.01);
(Continued)

(58) Field of Classification Search
CPC .... B01D 53/28; B01D 53/261; B01D 53/263; B01J 20/04; B01J 20/26
(Continued)

(56) References Cited

U.S. PATENT DOCUMENTS 4,599,114 A * 7/1986 Atkinson .................. 106/448
5,591,379 A   1/1997 Shores
(Continued)

FOREIGN PATENT DOCUMENTS

JP  2004143310  5/2004
JP  2008050188  3/2008
(Continued)

OTHER PUBLICATIONS

Eastaugh, N., Walsh, V., Chaplin, T., and Siddall, R. (2008) Pigment Compendium. New York, NY: Routledge p. 84.*
(Continued)

*Primary Examiner* — Mark Eashoo
*Assistant Examiner* — Andrew J Oyer
(74) *Attorney, Agent, or Firm* — Steinfl + Bruno LLP

(57) ABSTRACT

A desiccant composition is described. The desiccant composition has a polymeric binder and a dispersion of powders of hygroscopic inorganic oxides as desiccant materials, in which the desiccant powders are finely dispersed in consequence of their surface-modification by fatty acid anions without affecting their moisture sorption performances.

19 Claims, 1 Drawing Sheet

(51) Int. Cl.
   *B01J 20/28* (2006.01)
   *B01J 20/06* (2006.01)
   *B01J 20/04* (2006.01)
   *C01G 9/02* (2006.01)
   *C01G 45/02* (2006.01)

(52) U.S. Cl.
   CPC ....... *B01J 20/2803* (2013.01); *B01J 20/3085* (2013.01); *C01G 9/02* (2013.01); *C01G 45/02* (2013.01); *C01P 2004/61* (2013.01); *C01P 2004/62* (2013.01)

(58) Field of Classification Search
   USPC .............................. 252/194; 502/64; 438/115
   See application file for complete search history.

(56) References Cited

U.S. PATENT DOCUMENTS

| | | | |
|---|---|---|---|
| 6,226,890 B1* | 5/2001 | Boroson et al. | 34/472 |
| 6,534,571 B1* | 3/2003 | Hoover | C08K 3/22 524/433 |
| 6,599,446 B1* | 7/2003 | Todt et al. | 252/511 |
| 7,595,412 B2* | 9/2009 | Jennings | C07C 51/414 554/121 |
| 2008/0251760 A1* | 10/2008 | Solovyov et al. | 252/194 |

FOREIGN PATENT DOCUMENTS

| | | |
|---|---|---|
| JP | 2009-178681 A | 8/2009 |
| JP | 2011-025186 A | 2/2011 |
| WO | 2011117094 | 9/2011 |

OTHER PUBLICATIONS

International Search Report mailed on Jun. 12, 2013 for PCT/IB2013/051333 filed on Feb. 19, 2013 in the name of SAES GETTERS S.P.A.

Written Opinion mailed on Jun. 12, 2013 for PCT/IB2013/051333 filed on Feb. 19, 2013 in the name of SAES GETTERS S.P.A.

International Preliminary Report on Patentability mailed on Feb. 10, 2014 for PCT/IB2013/051333 filed on Feb. 19, 2013 in the name of SAES GETTERS S.P.A.

Wikipedia, "Coordination complex", last modified on Nov. 27, 2011. (Downloaded on Oct. 4, 2015). 7 pages.

Merriam-Webster "Pigment—Definition and More from the free Merriam-Webster Dictionary" Oct. 7, 2011, Retrieved from http://web.archive.org/web/20111007204113/http://www.merriam-webster.com/dictionary/pigment on Feb. 14, 2016. 2 pages.

* cited by examiner

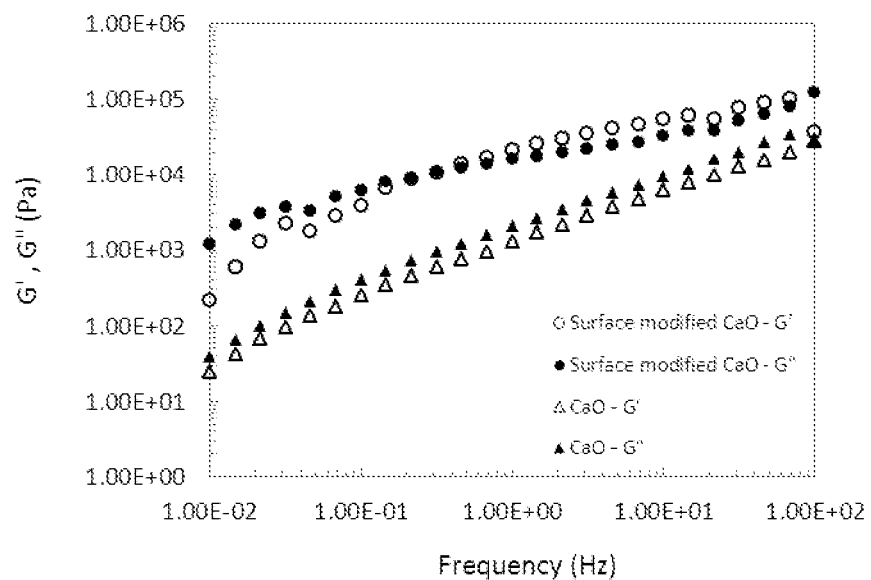

DESICCANT COMPOSITION CONTAINING SURFACE-MODIFIED POWDERS OF METAL OXIDES USEFUL FOR MANUFACTURE AND PROTECTION OF MOISTURE-SENSITIVE DEVICES

CROSS REFERENCE TO RELATED APPLICATIONS

The present application is the US national stage of International Patent Application PCT/IB2013/051333 filed on Feb. 19, 2013 which, in turn, claims priority to Italian Patent Application MI2012A000999 filed on Jun. 8, 2012.

The present invention relates to surface-modified particles of oxide, with particular reference to alkaline and alkaline-earth metal oxides, and to improve desiccant composition suitable to control the humidity level inside a packaged electronic device in order to prevent a premature failure thereof and/or a degradation of its performance.

Various electronic and industrial devices require humidity levels in the range of about 0.1 to 5000 parts per million (ppm) of water vapour because their performance is affected by moisture. Examples of these devices are micro-electro-mechanical devices (MEMs) and micro-opto-electromechanical devices (MOEMs), opto-electronic devices for telecommunication applications, medical implantable devices (pace-makers, defibrillators), organic electronic devices such as OLEDs, OLETs and organic solar cells (OPV).

Their preservation is typically achieved by encapsulating the devices using sealants suitable to reduce humidity transmission from the external environment and by inserting a desiccant composition inside the enclosure containing the moisture-sensitive device.

Alkaline and alkaline-earth oxides and other hygroscopic inorganic metal oxides often chemically absorb moisture providing lower moisture equilibrium pressure values and higher moisture capacity than physisorbing materials. However, as a consequence of their hygroscopic nature, these kinds of oxide powders can be affected by strong aggregation tendency, even in presence of low humidity amounts or other particular conditions related to manufacturing processes involving composite material wherein they are dispersed, resulting in difficulties to achieve a well dispersed composite material consisting in desiccant powders in a polymeric matrix.

U.S. Pat. No. 5,591,379 describes a composition having moisture gettering properties and consisting in desiccant material powders dispersed in a binder which is permeable to water vapor. The binder may be a polymer, a porous ceramic or a porous glass, all of them having the requisite to affect the moisture sorption speed as little as possible. U.S. Pat. No. 5,591,379 therefore is focused on maintaining the sorption properties of the desiccant composition but it is silent about how to achieve this goal, especially how to avoid the aggregation of the desiccant powders in the polymeric matrix and to limit all the possible negative effects of the exposure of the desiccant powders to environmental humidity during the manufacturing processes of the composition or of the moisture sensitive device wherein it is used.

A common way to improve dispersion of particles in polymeric matrix consists in the use of one or more additives, as for example ionic or non-ionic surfactants, capable of distributing in the liquid composition around the particle surface, thanks to their chemical functional groups. This practice allows an acceptable improvement of the composition when the inorganic particles are intended as fillers, i.e. elements acting to improve the mechanical strength of the composite material obtainable by solidification of the liquid composition itself. On the contrary, when the inorganic particles are used for their intrinsic properties, as for example their ability to sorb gases or moisture, the use of this kind of surfactants jeopardizes their function in the final composite solid material.

Alternatively to the use of surfactants, Japanese Patent publication JP 2008-050188 discloses a method for surface modification of inorganic fine particles and thermoplastic composite materials containing said particles. In order to improve the dispersion of the filler powders without leading to undesired light scattering effects, filler inorganic particles are previously surface-modified by subsequent reactions with a surface treating agent and then a silane coupling agent. Several kinds of inorganic particles are listed as modifiable filler by one of the possible couple of treating and coupling agents. Anyway, JP 2008-050188 is silent about how to maintain or improve not only the mechanical properties and the dimensional stability in the consolidated composite material, but also some chemical properties such as for example the gas sorption ability.

It is an object of the present invention to provide a desiccant composition suitable to be manipulated and used in manufacturing processes for moisture sensitive devices effectively reducing the aggregation phenomenon of the inorganic oxide particles dispersed therein and maintaining a moisture sorption ability in order to protect said sensitive devices.

In a first aspect, the present invention relates to a desiccant composition comprising particles of at least one first hygroscopic inorganic oxide dispersed in a polymeric binder, said particles having an external surface and being functionalized at said external surface by fatty acid anions of general formula $C_nH_{2n+1}COO^-$, wherein n is a integer number greater than 11.

According to the present invention, the optimization of the composition in its chemi-physical (with particular reference in the fine dispersion of the inorganic powders in the polymeric matrix) and functional properties (i.e. moisture sorption performance) can be achieved by using micrometric or sub-micrometric inorganic oxide particles, previously surface-modified by reaction with fatty acids having formula $C_nH_{2n+1}COOH$ with a carbon chain length (i.e. n) greater than 11, more preferably comprised between 13 and 23. Suitable fatty acids according to be used to functionalize the particles of said first hygroscopic inorganic oxide can be selected among the group comprising tetradecanoic acid, hexadecanoic acid, octadecanoic acid, icosanoic acid, docosanoic acid, tetracosanoic acid. Consequently, the fatty acid anion that can be used according to the present invention are selected between tetradecanoate, hexadecanoate, octadecanoate, icosanoate, docosanoate, tetracosanoate.

Preferably, said first hygroscopic inorganic oxide particles have dimensions comprised in the range of between 0.05 μm and 20 μm, more preferably between 0.1 μm and 10 μm. Dimensions between 0.1 and 1 micron are ideal for some specific deposition processing (i.e. ink-jet and spin coating).

The first hygroscopic inorganic oxide particles suitable to be used as functionalized desiccant materials according to the present invention can be selected among, but are not limited to, alkaline and alkaline-earth oxides such as magnesium oxide, calcium oxide, strontium oxide, barium oxide or other oxides as for example lithium oxide, manganese oxide and zinc oxide or mixtures thereof. The surface functionalization can be obtained starting from a metal oxide suspension in an aprotic and apolar solvent, such as for example toluene and 1-4-dioxane. Suspension is then heated at temperature of 90° C. or higher and, when temperature is achieved, the fatty acid is added in a molar ratio of preferably greater than 1:100 with respect the metal oxide. When reaction is complete, the particles are dried by reduced pressure evaporation or by rapidly spraying with a hot gas.

In a preferred embodiment of the present invention, that does not require the use of silanols or other additives to achieve the desired homogeneity and the absence of aggregates, the total solid content in the desiccant composition (i.e. the weight of the functionalized particles of said at least one first hygroscopic inorganic oxide contained in the desiccant composition) is comprised between 5% and 50% by weight, and preferably between 30% and 50% with respect to the desiccant composition weight.

In its preferred embodiment, the desiccant composition of the invention is a dispensable composition, having a viscosity comprised between $7*10^4$ and $5*10^5$ cP at shear rate of $5\ s^{-1}$ at 25° C. and the polymeric binder can be suitably selected, for example, among epoxy resins, epoxyacrylic resins, acrylic resins, polyurethane resins and siloxane matrices. In an alternative embodiment related to ink-jet processing, the dispensable composition shows a viscosity comprised between 10 and 100 cP at shear rate of $5\ s^{-1}$ at 40° C.

In an alternative embodiment according to the present invention, the desiccant composition can further contain a second hygroscopic inorganic oxide in association to said at least one first functionalized hygroscopic inorganic oxide as above described. Said second hygroscopic inorganic oxide is not functionalized and is selected among oxides with lower molecular weight and lower surface area in comparison to the first selected hygroscopic oxide, lithium oxide or magnesium oxide being the choice for a preferred embodiment of the invention.

Said second hygroscopic inorganic oxide can be comprised between 10 and 50 w/w % respect to the total hygroscopic inorganic oxide content.

The desiccant composition according to the present invention is suitable to be dispensed through the methods commonly used in manufacturing and laboratory processes, for example needle dispensing, jet dispensing, screen printing, blading, dipping. For low viscosity formulations, ink-jet printing can be adopted. Desiccant bodies or films can finally be easily obtained by thermal treatment, usually comprised between 80 and 120° C.

Said desiccant bodies or films essentially maintain the same chemistry of the dispensable desiccant composition, only minor changes due to the consolidation polymerization mechanism may be observed, because no solvent is used in their formulation and no crosslinking reactions are expected between the inorganic particles or their surface-modification and the polymeric binder of the composition. For this reason, high viscosity ($>7*10^4$ cP at shear rate of $5\ s^{-1}$ at 25° C.) desiccant compositions can be used in the final application also without inducing any polymerization mechanism. For low viscosity (<100 cP at shear rate of 5 s−1 at 40° C.) desiccant compositions, a radical polymerization is a preferred mechanism for the consolidation process.

Deposition of the desiccant composition or insertion of pre-formed bodies or films can be suitably carried out in the manufacturing processes of electronic devices without a degradation of rheological properties of the composition and guaranteeing the needed moisture sorption properties. The protection of the electronic devices can therefore be achieved thus limiting the risks of manufacturing problems or undesired effect of aggregates in the absorbing composite material.

The invention will be now illustrated by the following not limiting examples.

EXAMPLE 1

50 g of CaO are dispersed in toluene under stirring (1 L flask) and the resulting dispersion is heated up to 90° C. Stearic acid is then added in a molar ratio of 1:100 with respect to the calcium oxide and the dispersion is stirred for three hours. In the subsequent step, particle drying process is performed by reduced pressure evaporation and the obtained dry powders are dispersed in a polar solvent for hydrophilic test. Due to hydrophilic behavior of raw metal oxide particles, CaO powders show physical affinity with polar solvent and homogeneous dispersions can be easily obtained in water. Conversely, the introduced surface modification is able to induce a steric hindrance on the particle surface, leading to a strong modification of its properties. Surface-modified CaO powder shows physical incompatibility with polar solvent and homogeneous dispersion in polar solvent cannot be obtained any more. This test can be used to verify the efficiency of particle surface modification.

Surface-modified CaO particles are characterized in terms of moisture gettering performances ($H_2O$ sorption capacity and kinetic) by means of gravimetric test in climatic chamber (25° C., 55% RH). The recorded results show a sorption capacity higher than 25% wt, which is suitable for moisture-sensitive device application. The sorption kinetic does not show significant modification in comparison to raw CaO particles.

In this regard, desiccant formulation according to the present invention is obtained by dispersing 40 g of surface-modified CaO particles in 60 g of a siloxane matrix. The obtained dispersion is processed through a refining process to optimize the particles dispersion and analyzed by rheological characterization.

When the desiccant formulation based on surface-modified CaO particles is evaluated in terms of gettering performances and compared to a formulation based on raw CaO particles with the same total sorption capacity, no significant difference is observed in H2O sorption kinetic.

Frequency sweep tests carried out with cone-plate geometry within linear viscoelastic region between $10^{-2}$ to $10^2$ Hz (FIG. 1).

The mechanical spectrum of siloxane matrix filled with surface modified CaO displays within the experimental frequency range the transition between the terminal region, where rheological behaviour is dominated by viscous flow, to plateau region revealing the presence of a network spanning the whole volume.

EXAMPLE 2

50 g of $MnO_2$ are dispersed in toluene under stirring (1 L flask) and the resulting dispersion is heated up to 90° C. Stearic acid is then added in a molar ratio of 1:100 with respect to the metal oxide and the dispersion is stirred for three hours. In the subsequent step, particle drying process is performed by reduced pressure evaporation and the obtained dry powders are dispersed in a polar solvent for hydrophilic test. Surface-modified $MnO_2$ powder shows physical incompatibility with polar solvent and homogeneous dispersions in polar solvent cannot be obtained anymore. When hydrophilic test is performed in water no particle dispersion is obtained confirming a strong modification in particle surface energy.

EXAMPLE 3-COMPARATIVE

Desiccant formulation is obtained by dispersing 40 g of raw CaO particles in 60 g of a siloxane matrix. The obtained dispersion is processed through a refining process to optimize the particles dispersion and analyzed by rheological characterization.

Frequency sweep tests carried out with cone-plate geometry within linear viscoelastic region between $10^{-2}$ to $10^2$ Hz, show no dominance of viscous flow in rheological behavior and the difference in the mechanical spectrum of surface-modified CaO particles dispersed in a siloxane matrix in respect to that of un-modified CaO particles dispersed in the same polymeric matrix. Surface modified CaO enhance the mechanical properties of siloxane matrix and slow down the relaxation properties of the system reducing the water transport.

EXAMPLE 4-COMPARATIVE 50 g of CaO are dispersed in toluene under stirring (1 L flask) and the resulting dispersion is heated up to 90° C. Laurie acid (n=11) is then added in a molar ratio of 1:100 with respect to the metal oxide and the dispersion is stirred for three hours. In the subsequent step, particle drying process is performed by reduced pressure evaporation and the obtained dry powders are dispersed in a polar solvent for hydrophilic test. Treated CaO powder shows good physical compatibility with polar solvent and homogeneous dispersions in moisture are obtained. Laurate-based surface modification is not able to modify the particle surface energy.

EXAMPLE 5

A desiccant formulation according to the present invention is obtained by dispersing 20 g of surface-modified CaO particles and 20 g of un-modified $Li_2O$ in 60 g of a siloxane matrix. The obtained dispersion is processed through a refining process to optimize the particles dispersion and is evaluated in terms of gettering performances.

This formulation shows a sorption speed of 2.0 mg cm-2 min-1 during the first 5 hours exposure at 22° C. 55% RH.

The invention claimed is:

1. A desiccant composition consisting of:
   particles of at least one first hygroscopic inorganic oxide and a polymeric binder, said particles of at least one first hygroscopic inorganic oxide having an external surface and being selected in the group consisting of alkali metal oxides, alkaline-earth metal oxides, manganese oxide and zinc oxides,
   wherein
   said particles of at least one first hygroscopic inorganic oxide have dimensions in the range of from 0.05 μm to 20 μm and are functionalized at said external surface by anions of general formula $C_nH_{2n+1}COO^-$, wherein n is an integer number greater than 11.

2. The desiccant composition according to claim 1, wherein n is between 13 and 23.

3. The desiccant composition according to claim 2, wherein said anions of general formula $C_nH_{2n+1}COO^-$ are selected in the group consisting of tetradecanoate, hexadecanoate, octadecanoate, icosanoate, docosanoate, tetracosanoate.

4. The desiccant composition according to claim 1, wherein said first hygroscopic inorganic oxide is selected in the group consisting of lithium, magnesium, calcium, strontium and barium oxides.

5. The desiccant composition according to claim 1, wherein the particles of said first hygroscopic inorganic oxide are in amount of between 5% and 50% by weight with respect to the total composition weight.

6. The desiccant composition according to claim 1, wherein the molar ratio of said anions of general formula $C_nH_{2n+1}COO^-$ with respect to said first hygroscopic inorganic oxide is higher than 1:100.

7. A desiccant composition consisting of:
   particles of at least one first hygroscopic inorganic oxide and a polymeric binder, said particles of at least one first hygroscopic inorganic oxide having an external surface and being selected in the group consisting of alkali metal oxides, alkaline-earth metal oxides, manganese oxide and zinc oxides,
   wherein
   said particles of at least one first hygroscopic inorganic oxide have dimensions in the range of from 0.05 μm to 20 μm and are functionalized at said external surface by anions of general formula $C_nH_{2n+1}COO^-$, wherein n is an integer number greater than 11, and
   a second hygroscopic inorganic oxide.

8. The desiccant composition according to claim 7, wherein said second hygroscopic inorganic oxide is selected among lithium oxide and magnesium oxide.

9. The desiccant composition according to claim 7, wherein the weight concentration of said second hygroscopic inorganic oxide is comprised between 10 and 50 w/w % respect to the total hygroscopic inorganic oxide content.

10. The desiccant composition according to claim 1, wherein said polymeric binder is selected in the group consisting of epoxy resins, epoxyacrylic resins, acrylic resins, polyurethane resins and siloxane matrices.

11. A moisture-sensitive device containing a desiccant body or film comprising the desiccant composition according to claim 1.

12. The moisture-sensitive device according to claim 11, wherein said moisture-sensitive device is selected in the group consisting of microelectromechanical devices, micro-opto-electromechanical devices, opto-electronic devices for telecommunication applications, medical implantable devices, organic solar cells and organic electronic devices.

13. The desiccant composition according to claim 1, wherein said particles of at least one first hygroscopic inorganic oxide have dimensions in the range from 0.1 to 10 μm.

14. The desiccant composition according to claim 1, wherein the particles of said first hygroscopic inorganic oxide are in amount of between 30% and 50% by weight with respect to the total composition weight.

15. The desiccant composition according to claim 1, wherein the anion of general formula $C_nH_{2n+1}COO^-$ is comprised in a corresponding carboxylate salt of a metal selected in the group consisting of alkali metals, alkaline-earth metals, manganese and zinc.

16. The desiccant composition according to claim 7, wherein the second hygroscopic inorganic oxide is not functionalized by the anions of general formula $C_nH_{2n+1}COO^-$.

17. The desiccant composition according to claim 16, wherein the second hygroscopic inorganic oxide has a lower molecular weight and lower surface area than the first hygroscopic inorganic oxide.

18. The desiccant composition according to claim 1, wherein the desiccant composition has a sorption capacity of at least 25% by weight.

19. The desiccant composition according to claim 7, wherein the desiccant composition has a sorption speed of 2.0 mg cm$^{-2}$ min$^{-1}$ at 22° C. and 55% relative humidity.

* * * * *